United States Patent Office 3,629,340
Patented Dec. 21, 1971

3,629,340
SYNTHESIS OF PERFLUOROPARACRESOL, POLY-OXYPERFLUOROBENZYLENE AND RELATED MONOMERS AND POLYMERS
Leo A. Wall, Washington, D.C., and Joseph M. Antonucci, Silver Spring, Md., assignors to the United States of America as represented by the Secretary of the Navy
No Drawing. Original application Dec. 29, 1964, Ser. No. 422,089, now Patent No. 3,394,190, dated July 23, 1968. Divided and this application June 25, 1968, Ser. No. 767,863
Int. Cl. C07c 39/24
U.S. Cl. 260—623 R         1 Claim

ABSTRACT OF THE DISCLOSURE

A method for preparing the monomers

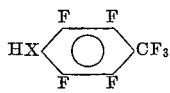

where X may be S, O, NH or NR (where R may be either alkyl or aryl) which comprises treating octafluorotoluene with a tertiary thiobutoxy or butoxy lithium nucleophilic reagent in an ether diluent to produce an intermediate and heating the intermediate between 150° and 850° C.

---

The invention described herein may be manufactured and used by or for the Government of the United States of America for governmental purposes without the payment of any royalties thereon or therefor.

CROSS REFERENCE TO RELATED APPLICATIONS

This application is a divisional of Ser. No. 422,089, filed Dec. 29, 1964, now Pat. No. 3,394,190.

BACKGROUND OF THE INVENTION

This invention relates to the manufacture of polymers of high thermal stability and desirable physical properties such as high tensile strength, resistance to strong chemicals and thermoplastic and elastomeric character and more particularly to the preparation of perfluoroaromatic polymers, including those of the monomer p-heptafluorocresol.

It has been previously discovered that paratrifluoromethylphenol, when treated with cold dilute alkali or a trace of hydrogen fluoride, forms a polymer of the type shown below:

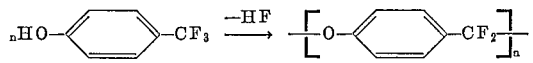

The completely fluorinated analog of this polymer may possess properties required for high temperature elastomers.

SUMMARY OF THE INVENTION

It is the object of the present invention to follow both direct and synthetic routes to polymers of perfluoroaromatic monomers.

It is another object of the present invention to produce the monomer p-heptafluorocresol and its polymers.

It is still another object of the present invention to so control the process of or the production of the polymers to provide a useful product which may be an oil, a wax, a resin or a lubricant.

It is a still further object of the present invention to provide a process for the production of a polymer which may be controlled to produce a material exhibiting physiological activity, viz, drugs, pesticides, fungicides or the like.

Other objects, advantages and novel features of the invention will become apparent from the following detailed description of the invention.

DESCRIPTION OF THE PREFERRED EMBODIMENT

One of the direct methods, the use of potassium hydroxide in t-butyl alcohol with octafluorotoluene produced a polymeric acid. In addition to small quantities of the para cresol, somewhat larger amounts of the meta and ortho isomers were also isolated. The principal product was a polymeric solid, which arose from the alkali catalyzed polymerization of the para and ortho cresols.

In order to obtain high polymers, the pure para isomer of heptafluorocresol is necessary. The procedure employed involves the prior preparation of 1-t-butoxy-2,3,5,6-tetrafluoro - 4 - trifluoromethylbenzene (p-t-butoxy-heptafluorotoluene) and its subsequent pyrolysis to 2,3,5,6-tetrafluoro - 4 - trifluoromethylphenol and isobutene as shown below:

1.

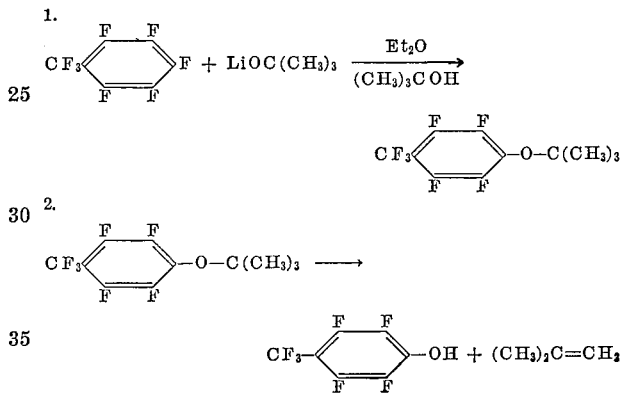

The t-butyl ether of the cresol was prepared by refluxing equivalent amounts of lithium t-butoxide in a suitable solvent (t-butyl alcohol, ether, hydrocarbons, etc.). The t-butyl ether, after isolation, then can be pyrolyzed (gas phase or liquid phase) at relatively low temperatures (200–250° C.) to give the para isomer of perfluorocresol, isobutene is a by-product. The overall yield from the octafluorotoluene is 70–75.

Vapor-phase chromatographic analysis shows the product to be one substance and infrared analysis indicates that the hydroxyl group is para to the trifluoromethyl group. The cresol had a B.P. of 142° C.

Polymerization of 2,3,5,6-4-trifluoromethylphenol potassium hydroxide in t-butyl alcohol Approximately 6 g. (0.025 moles) of octafluorotoluene and 3.8 g. (0.068 mole) of potassium hydroxide were combined with 50 ml. of t-butyl alcohol and heated under reflux for 14 hours. The solvent (t-butyl alcohol) was removed by distillation under vacuum. The non-volatile solids were added to enough 10 aqueous hydrogen chloride to give an acid reaction to litmus. A tan solid did not dissolve and was washed repeatedly with water to remove any potassium fluoride. The polymer was dried, dissolved in ether and then filtered. Evaporation of the ether under vacuum left a tan crystalline solid, M.P. 65–70° C.

5% Sodium bicarbonate solution

About 1 g. of the p-cresol and 15 ml. of a 5% aqueous solution of sodium bicarbonate were refluxed for 17 hours. The white polymeric solid was separated by filtration and washed repeatedly with hot water and allowed to air dry. The solid was dissolved in ether and the solvent was removed under vacuum to give a crystalline solid, M.P. 70–75° C.

1% Potassium fluoride solution

About 0.5 g. of the pre-cresol was mixed with 10 ml. of a 1% aqueous potassium fluoride solution and refluxed for three hours. A white hard solid was formed along with a tacky solid. The white solid, after washing with water and vacuum drying, had a tough crystalline appearance, M.P. 70–80° C. The tacky solid probably was low of molecular weight. The thermal volatilization of various experimental samples of the polyoxyperfluorobenzylene were investigated. As shown below, Table I summarizes a typical experiment in which the polymer was heated successively for one hour at the indicated temperatures. Considering the preliminary stage development with this polymer, the thermal stability is encouraging. It may be anticipated that this structure would be the basis for many useful materials.

TABLE I.—THERMAL VOLATILIZATION OF POLYOXYPERFLUOROBENZYLENE

| Weight | Percent wt. lost | | Treatment | |
| --- | --- | --- | --- | --- |
| | Incremental | Total | Time, hrs. | Temp.; °C. |
| 18.35 | 0 | 0 | 0 | |
| 17.50 | 4.6 | 4.6 | 1 | 110 |
| 13.30 | 22.8 | 27.4 | 1 | 250 |
| 2.00 | 61.5 | 88.9 | 1 | 350 |

The method employed for the synthesis of 2,3,5,6-tetrafluoro-4-trifluoromethylphenol is being extended to the synthesis of such monomers as 2,3,5,6-tetrafluoro-4-trifluoromethylthiophenol and 2,3,5,6-tetrafluoro-4-trifluoromethylaniline. The general reaction is shown below:

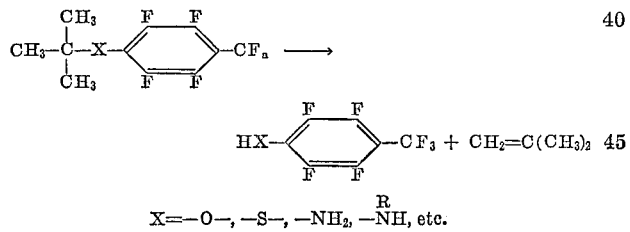

X=—O—, —S—, —NH$_2$, —NH$^R$, etc.

For example, the para-heptafluorothiocresol can be prepared by the reaction of the lithium salt of t-butyl mercaptan and octafluorotoluene in a suitable solvent to give the p-t-butyl - 2,3,5,6 - tetrafluorotrifluoromethylphenyl sulfide. Pyrolysis of the sulfide would then lead to the formation of the desired parathiocresol. Similarly, one can prepare the amino analog by the reaction of t-butyl amine and octafluorotoluene and the subsequent pyrolysis of t-butyl - 2,3,5,6 - trifluoromethylaniline. Monosubstituted anilines may also be prepared by this method. These monomers yield polymers analogous to those described for 4-trifluoromethylphenol. For example, p-heptafluorocresol and p-heptafluorothiocresol give the polymers shown below:

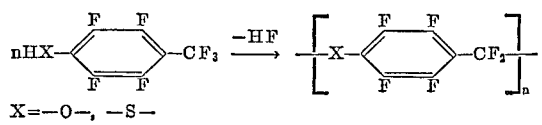

X=—O—, —S—

The amino analogous would behave in a similar fashion except that the unsubstituted anilines undergo a more complicated polymerization as shown below:

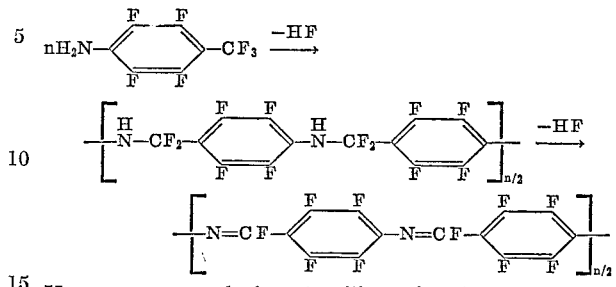

However, monosubstituted anilines give the normal polymer as shown:

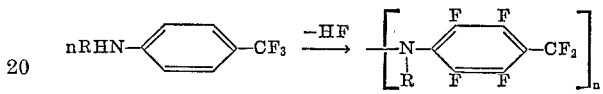

R=alkyl, aryl, etc.

Still other monomers that would be expected to give polymers of the type described are 4-trifluoromethylbenzyl organometallics as shown for the heptafluoro- and nonafluoro-benzyl compounds:

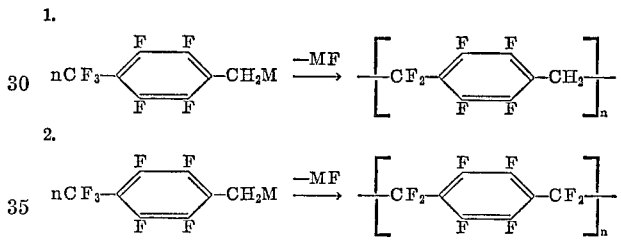

M=—Li, —MgBr

Obviously many modifications and variations of the present invention are possible in the light of the above teachings. It is therefore to be understood that within the scope of the appended claims the invention may be practiced otherwise than as specifically described.

What is claimed is:
1. The compound

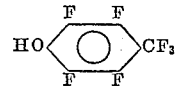

References Cited
UNITED STATES PATENTS 3,243,411  3/1966  Tawney et al. _____ 260—47
3,338,844  8/1967  Harris et al. _____ 260—47

OTHER REFERENCES

Alsop et al., "J. Chem. Soc." (London), 1962 pp. 1801–1805.
Hudlicty, "Chem. Org. Fluorine Comp." (1962) p. 242.
McLoughlin et al., "Chem. & Ind." (1964) p. 1557.
Reid, "Org. Chem. Bivalent Sulfur," vol. II (1960), p. 24.

BERNARD HELFIN, Primary Examiner
W. B. LONE, Assistant Examiner

U.S. Cl. X.R.

All cross-references adequately provided by Parent Pat. #3,394,190